United States Patent [19]
Kirkham

[11] 4,154,396
[45] May 15, 1979

[54] DIGITAL DATA READER

[75] Inventor: Edward E. Kirkham, Brookfield, Wis.

[73] Assignee: Kearney & Trecker Corporation, West Allis, Wis.

[21] Appl. No.: 780,469

[22] Filed: Mar. 23, 1977

[51] Int. Cl.² .................... G06K 7/10; H04N 3/00; G06F 7/38; G11B 5/09

[52] U.S. Cl. .................. 235/458; 235/92 MP; 360/51

[58] Field of Search .............. 235/61.11 R, 92 MP, 235/458, 475, 92 V; 340/146.3 K; 360/51, 71, 72, 73, 74; 178/6.8, 6; 353/26 A; 226/8

[56] References Cited

U.S. PATENT DOCUMENTS

| | | | |
|---|---|---|---|
| 3,651,310 | 3/1972 | Link | 235/61.7 B |
| 3,793,508 | 2/1974 | Maggi | 235/92 V |
| 3,895,184 | 7/1975 | Komura | 178/6 |
| 3,937,927 | 2/1976 | Weigert | 235/61.11 R |
| 3,941,978 | 3/1976 | Huston | 235/61.11 R |
| 3,967,316 | 6/1976 | Suyama | 360/51 |

Primary Examiner—Robert M. Kilgore
Attorney, Agent, or Firm—Cyril M. Hajewski; Donald J. Piggott

[57] ABSTRACT

The tape in a tape reader is braked to a stop relatively slowly instead of being stopped on one character. Two sprocket reading photocells are mounted on the tape reader to provide quadrature sprocket waveforms which are applied to a bi-directional sprocket counter coupled to the address conductors of a buffer memory. The data read off the tape by the tape reader is written into the buffer memory at the addresses indicated by the sprocket counter. An output pointer counter is also coupled to the buffer memory address conductors in parallel with the sprocket counter through a time division multiplexer. During the time interval in which the output pointer counter is connected to the buffer memory address conductors, data can be read out of the buffer memory at the address indicated by the output pointer counter independently of the sprocket counter.

6 Claims, 7 Drawing Figures

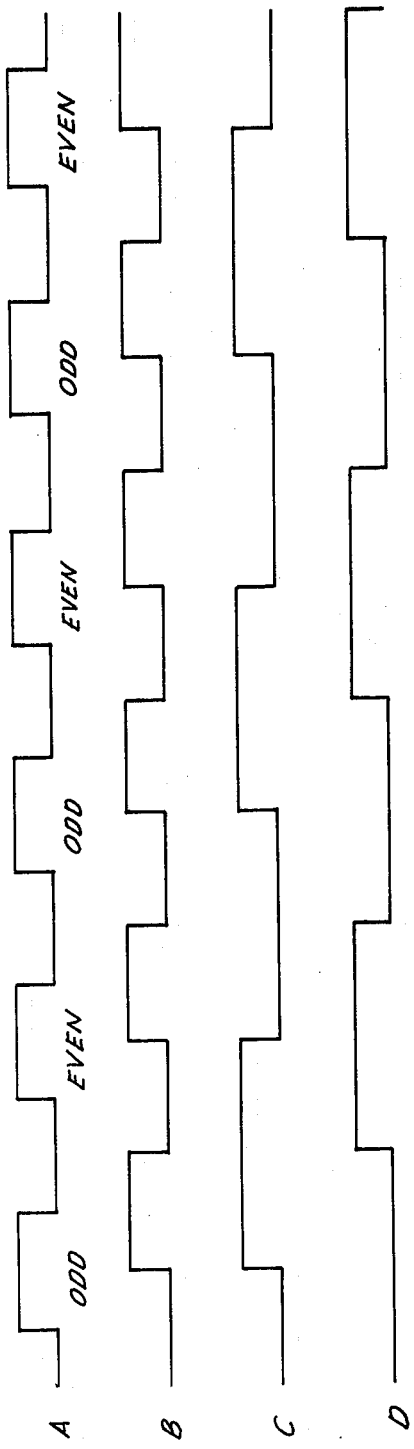

4,154,396

DIGITAL DATA READER

BACKGROUND OF THE INVENTION

This invention relates to digital data readers such as tape readers for reading digital data off punched tape. In numerically controlled machine tools, such tape readers are normally run at approximately 300 characters per second (30 inches per second) and are normally required to be able to stop within one character (0.1 inch) while operating at full speed. This stringent stopping requirement has led to some very sophisticated and expensive tape transports which require much scheduled and unscheduled maintenance and which have relatively short lives. In a typical bi-directional prior art tape reader, the following special tape drive and braking equipment is required in addition to the tape reel drive motors and brakes: two motor driven capstans; two electromagnetic pinch rolls; and two elecromagnetic tape brakes, plus the control circuits and power amplifiers for all of the above.

The principal object of this invention is to simplify such tape readers and significantly reduce their cost by eliminating the necessity for quick stops.

Another object of this invention is to raise the reading speed of such tape readers by eliminating the necessity for quick stops.

A further object of this invention is to improve the reliability of and extend the operating life of such tape readers by eliminating the necessity for quick stops.

An additional object of this invention is to provide a tape reader which can be reversed to re-read a character or characters previously read.

Other objects and advantages of the invention will be apparent from the description which follows.

SUMMARY OF THE INVENTION

In accordance with this invention, the necessity for quick stopping of a tape reader is eliminated by providing a buffer memory for storing the data read out of the tape reader along with a sprocket counter for entering the data into the buffer memory in sequence, an output pointer counter for reading the data out of the buffer memory in sequence, and a time division multiplexer for permitting independent operation of the sprocket counter and output pointer counter. The multiplexer alternately switches the address conductors of the buffer memory between the sprocket counter and output pointer counter so that write-in can be performed at one address during one time interval while readout is performed at a different address in the following time interval independently of the sprocket counter. This permits an accumulation of data in the buffer memory during the time interval that the tape reader is being braked to a stop and allows the stop time period to be extended from one character to many, e.g., to 100 or more characters. Due to the independent input and output counters and the time-sharing arrangement therebetween, the extra characters read out during the stopping time interval are stored in the buffer for future use without interfering with the orderly utilization of characters previously stored therein. Extending the stop time interval from one character to many greatly simplifies the tape reader, reduces its cost, increases its reliabilty, and lengthens its working life.

To give the tape reader a bi-directional scan capability, and to eliminate errors due to tape bounce back during a stop, a bi-directional sprocket counter is preferably employed which is controlled by two sprocket photocells positioning to provide quadrature sprocket waveforms. This makes it possible to run the tape backward to re-read a character or characters previously read. If the tape bounces back one or more characters during a stop, the bi-directional sprocket counter follows the bounce back and thus prevents errors due to bounce back.

BRIEF DESCRIPTION OF THE DRAWINGS

FIG. 4 is a set of waveforms and logic equations illustrating the derivations and operation of the first stage of the sprocket counter for the preferred embodiment of the invention;

DESCRIPTION OF THE PREFERRED EMBODIMENT

Figure 3:
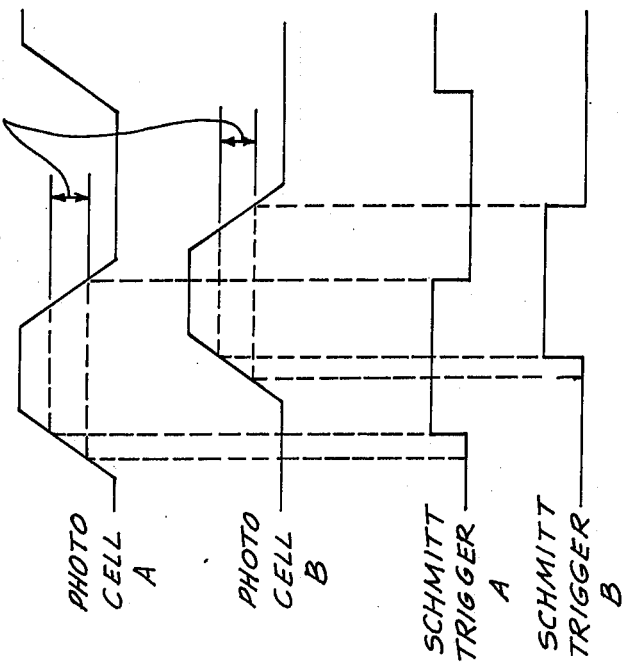
FIG. 3 is a set of waveforms illustrating the output of the sprocket reading photocells for the preferred embodiment of the invention.

The preferred embodiment of the invention includes a conventional right tape reel 10 (FIG. 1) and left tape reel 12 both adapted to hold a conventional punched tape 14 along with means for rotatably mounting reels 10 and 12 on a conventional tape reader chassis (not shown). Conventional tape guide rollers 16 are mounted on the tape reader chassis for leading tape 14 over a tape scanner head 18 which is illuminated by a lamp 17 and is conventional in most respects but which contains two sprocket photocells 19 instead of one, the sprocket photocells 19 being spaced apart along the longitudinal axis of tape 14 by a spacing which is sufficient to produce quadrature sprocket voltages for reasons described hereinafter. Except for the dual, spaced, sprocket photocells 19, scanner head 18 is conventional in structure and contains a photocell for each data channel of tape 14 in addition to the dual sprocket photocells 19. Tape 14 can be any conventional punched tape which is adapted to be read by scanner head 18.

Figure 1:
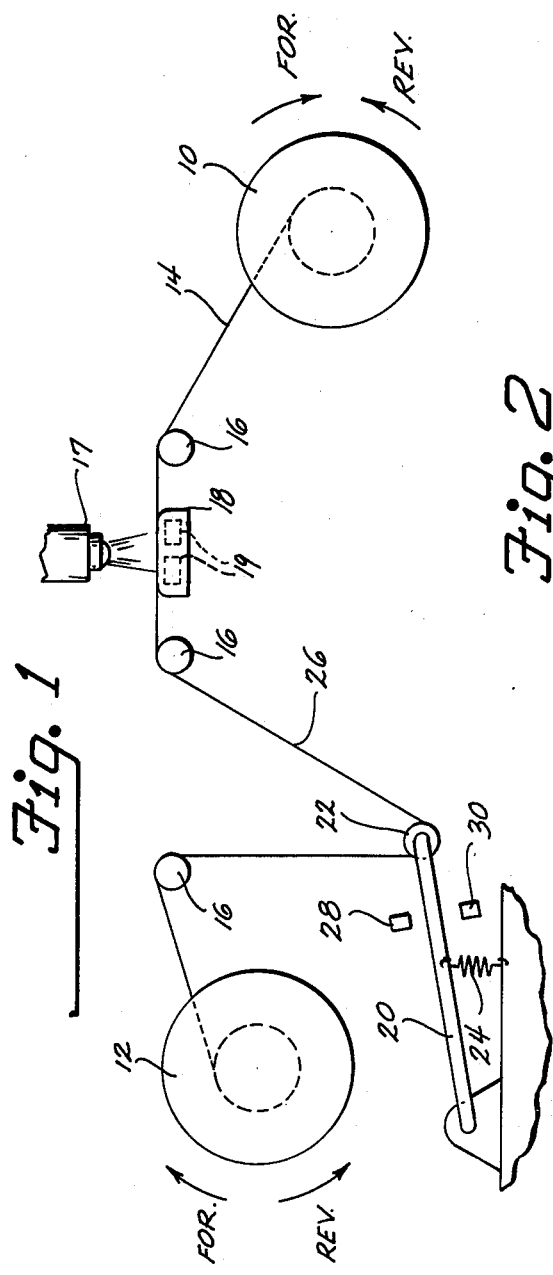
FIG. 1 is a diagrammatic representation of the tape reels, tape guide rollers, tape reading head, and dancing roll arm of the preferred embodiment of the invention.

A conventional dancing roll arm 20 carrying a dancing roll 22 is pivotally mounted on the tape reader chassis by conventional means and is spring loaded downwardly by a spring 24 to press dancing roll 22 against a slack loop 26 in tape 14 to create a predetermined static tension therein. An upper dancing roll arm position transducer 28 and lower dancing roll arm position transducer 30 are mounted above and below the rest position of dancing roll arm 20 as indicated in FIG. 1. Position transducers 28 and 30 can be photo-electric, electromagnetic, capacitive, or other transducers which produce an output signal when dancing roll arm 20 reaches their level. These signals are used to control left tape reel 12 as described hereinafter.

Tape 14 has data indicia thereon such as punched holes arranged in discrete characters along with reference indicia such as sprocket holes arranged to identify the location of each character. In this particular example, each character has 8 bits but more or fewer bits could be used per character if desired.

Figure 2:
FIG. 2 is a schematic diagram of the motor and brake control circuit for the preferred embodiment of the invention.

Each of the tape reels 10 and 12 can be driven forward (clockwise in FIG. 1) or reverse (counterclockwise in FIG. 1) by conventional reel drive motors 32 and 34 (FIG. 2). In this particular embodidment, reel motors 32 and 34 are conventional a.c. induction motors each having a pair of field windings 36-38 and 40-42 which are coupled together in parallel by phase shifting capacitors 44 and 46 respectively. Normally open forward contacts $F_1$-$F_2$ and normally open reverse contacts $R_1$-$R_2$ are connected in series with field windings 36-38 and 40-42 in the conventional manner to cause forward or reverse rotation of motors 32 and 34 when the corresponding contacts are closed.

Contacts $F_1$ and $R_1$ are operated by conventional relays (not shown ) which are energized when it is desired to move the tape either in the forward or the reverse direction. Contacts $F_2$ and $R_2$ are operated by dancing roll arm position transducers 28 and 30 respectively and serve to slave left reel motor 34 to dancing roll arm 20. Contact $F_2$ closes when dancing roll arm 20 reaches the level of upper position transducer 28 and opens when arm 20 drops below the level of upper transducer 28. Contact $R_2$ closes when dancing roll arm 20 reaches the level of lower postion transducer 30 and opens when arm 20 rises above the level of lower transducer 30. This automatically drives left reel motor 34 to maintain dancing roll arm 20 between position transducers 28 and 30.

Motors 32 and 34 are each braked by normally spring actuated brakes (not shown) which are electrically de-actuated by brake coils 48 and 50, respectively, which are coupled in series with each other and with normally open brake contacts B. Brake contacts B are acutated by a brake relay (not shown) when it is desired to release the brakes. The motor brakes are normally actuated and are released by energizing coils 48 and 50 when it is desired to run either or both motors 32 and 34.

Although the right and left brake coils 48 and 50 are energized simultaneously in the circuit of FIG. 2, it will be obvious that they could be placed in separate circuits if desired so that they could be energized separately. It will also be obvious that the contacts $F_1$-$R_1$ , $F_2$-$R_2$, and B, along with their respective relays, could be replaced by solid state switch elements if desired. In addition, instead of being de-actuated by brake coils 48 and 50, the brakes could be actuated thereby if desired.

When right motor 32 is switched on either forward or reverse, left motor 34 will switch on in the same direction immediately thereafter as soon as enough slack is taken up or let out in tape loop 26 to cause dancing roll arm 20 to actuate either position transducer 28 or 30. When right motor 32 is switched off, left motor 34 will switch off immediately thereafter due to a similar action. Brake coils 48 and 50 are de-energized when the motors are switched off and permit the spring loaded brakes to bring the motors to a stop relatively slowly, e.g., within 100 characters on tape 14. The fact that the brakes stop the motors relatively slowly, instead of within one character as was previously required, permits a great simplification and reduction in cost both in the tape drive and the brakes. The slow braking permits the following items to be eliminated from a typical prior art tape reader: two motor driven capstans; two electromegnetic pinch rolls; and two electromagnetic tape brakes, plus the control circuits and power amplifiers for all of the above. The simplified tape reader of this invention requires much less maintenance than those heretofore known, is much more reliable, less expensive, and has a significantly longer life.

Figure 7:
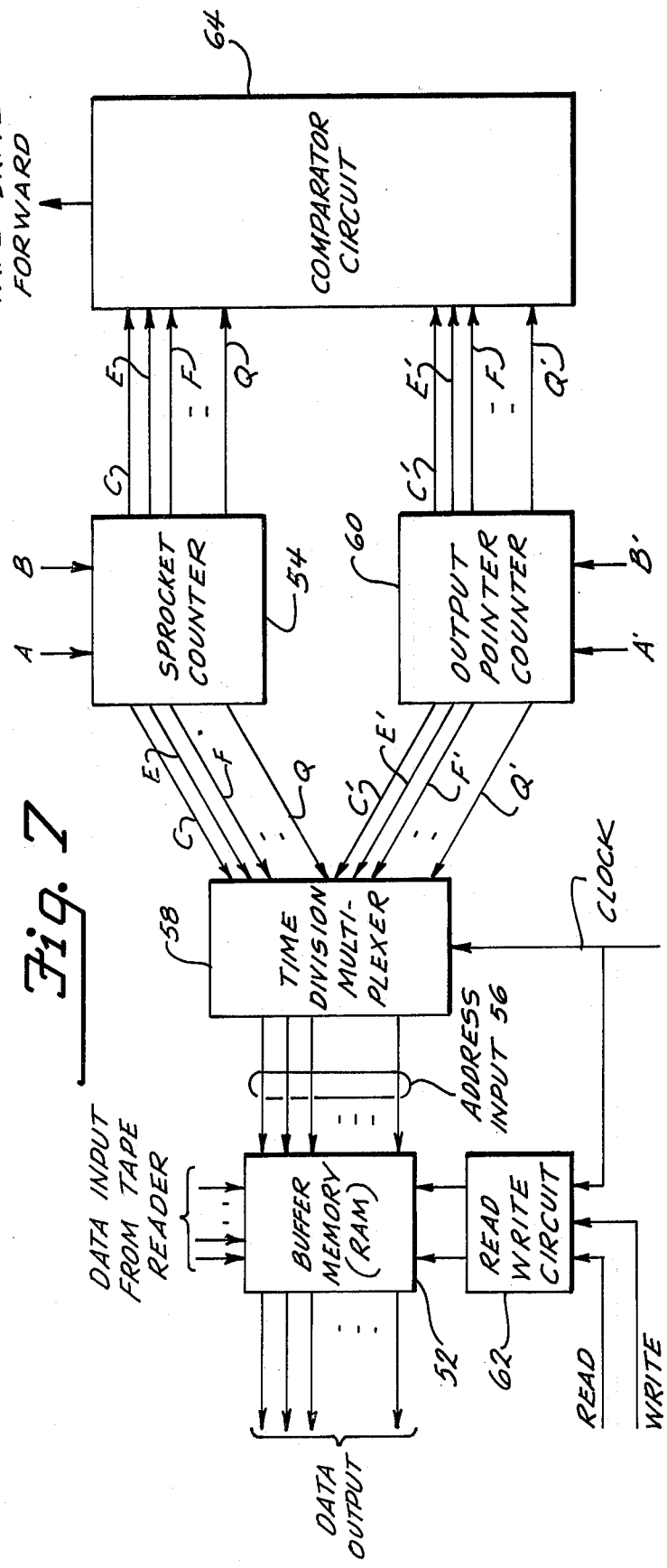
FIG. 7 is a block diagram of the data handling circuits for the preferred embodiment of the invention.

In order to eliminate the requirement of stopping within one character, it is necessary to provide means for handling the characters which are read during the slow stop. This means is shown in FIG. 7. The data read off of tape 14 by scanner head 18 is written into a buffer memory 52 at the addresses specified by a sprocket or reference counter 54 which is coupled to the address input 56 of buffer memory 52 through a time division multiplexer 58. Sprocket counter 54 is incremented or decremented by signals from the sprocket photocells on scanner head 18 as is described hereinafter.

Data is read out of buffer memory 52 at the addresses specified by an output pointer counter 60 which is coupled to the address input 56 of buffer memory 52 through time division multiplexer 58. Multiplexer 58 alternately switches sprocket counter 54 and output pointer counter 60 onto the memory address input 56 so that data can be written into buffer memory 52 at the address in sprocket counter 54 in one time interval and data can be read out of buffer memory 52 at the address in output pointer counter 60 in the subsequent time interval.

Multiplexer 58 is switched by a clock signal from the output circuit for which the data is being read off of tape 14. This can be a machine tool control circuit, computer, or any other suitable circuit which has an available clock signal to apply to multiplexer 58. The same clock signal is applied to the read/write circuit 62 for buffer memory 52 to alternately enable the read and write circuits in the time intervals when the corresponding counter is coupled to the buffer memory address input 56. The read and write signal inputs for read/write circuit 62 comes from the output circuit for which the data is being read off of tape 14. The input A' - B' for output pointer counter 60 comes from the output circuit also.

It should be noted that data is not necessarily read out of and written into buffer memory 52 on alternate clock cycles but rather than the read and write circuits for buffer memory 52 are enabled on alternate clock cycles. There will be many time intervals during which data is neither being written into nor read out of buffer memory 52. Also, in the sequence of operation, a read-out cycle may follow a read-out cycle rather than a write-in cycle and vice versa.

The above-described multiplexed address input to buffer memory 52 enables sproket counter 54 and output point counter 60 to operate independently of one another. Thus sprocket counter 54 can be incremented or decremented while output pointer counter 60 remains stationary or vice versa. This enables any number of characters to be entered into buffer memory 52 during the stop time interval without upsetting the order in which the characters are read out of buffer memory 52. The number of surplus characers that can be entered into buffer memory 52 during the stop inteval is limited only by the capacity of buffer memory 52.

The output of sprocket counter 54 and output pointer counter 60 are applied to a comparator circuit 64 which compares the two numbers and generates a TAPE DRIVE FORWARD signal when the loaded portion of the buffer memory drops below a predetermined level. The TAPE DRIVE FORWARD signal serves to drive the tape drive motors in the forward direction except at the end of a tape reel when the TAPE DRIVE FORWARD signal is inhibited. Comparator circuit 64 serves to keep buffer memory 52 loaded with input data so that the data is available when it is needed by the output circuit. Comparator circuit 64 also maintains counters 54 and 60 within a predetermined range of each other.

Figure 5:
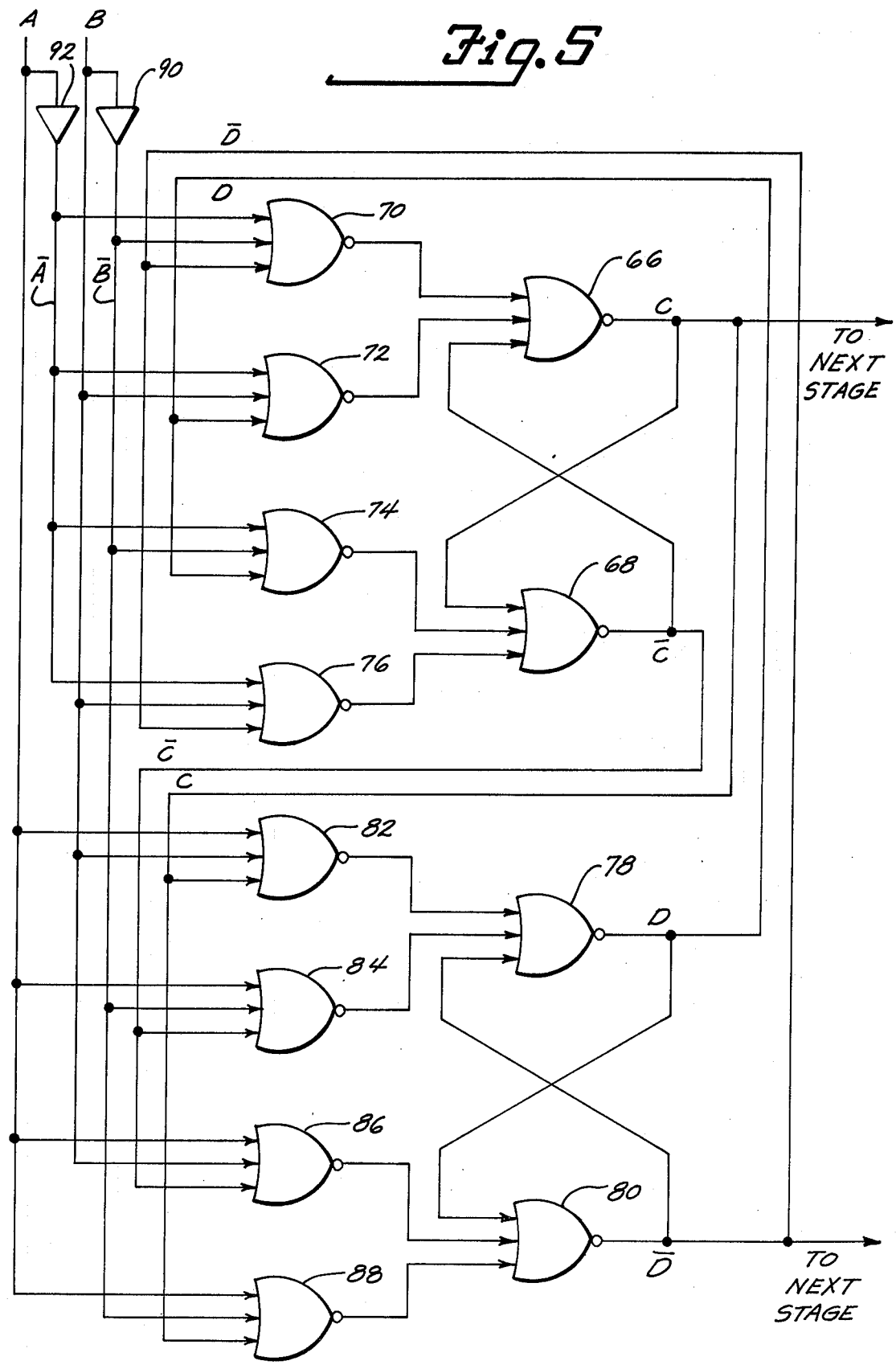
FIG. 5 is a block diagram of the first stage of the sprocket counter for the preferred embodiment of the invention.
Figure 6:
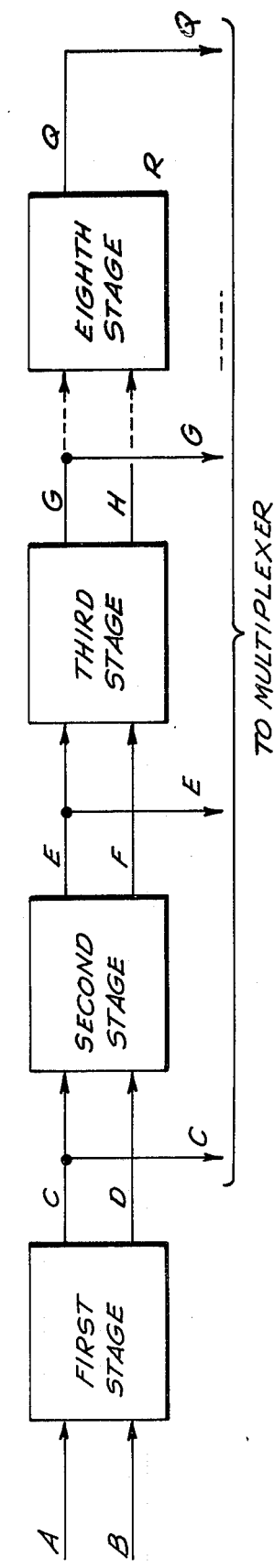
FIG. 6 is a block diagram of the complete sprocket counter for the preferred embodiment of the invention.

Although any suitable counter circuit can be utilized for sprocket counters 54 and output pointer counter 60, a preferred counter circuit is disclosed in FIGS. 4, 5 and 6 for operation in connection with the dual sprocket photocells on scanner head 18. As illustrated in FIG. 3, the dual sprocket photocells 19 (A and B) are spaced apart along the longitudinal axis of tape 14 by a distance which is sufficient to produce quadrature output signals as shown at PHOTOCELL A and B in FIG. 3. The output signals of photocells 19 (A and B) are applied to Schmitt triggers A and B whose output signals are shown in FIG. 3. The Schmitt triggers have a moderately wide hysteresis band, as indicated by the dashed lines, to prevent false triggering by noise or transient voltages.

The quadrature output voltages of schmitt triggers A and B are shown in FIG. 4 as waveforms A and B along with the waveforms C and D derived therefrom in accordance with the logical equations shown in FIG. 3. Waveforms C and D are the output of the first stage of a bi-directional sprocket counter which is illustrated in FIGS. 5 and 6. Each stage of the counter is identical to the circuit shown in FIG. 5, which is a NOR gate implementation of the logical equations shown in FIG. 4. The reason for using the dual quadrature spaced sprocket photocells 19 (A and B) whose output is shown in FIG. 3 along wth the counter circuit shown in FIGS. 4, 5, and 6 is to provide a bi-directional scan capability and to prevent errors due to tape bounce back when stopping. The quadrature sprocket photocell signals indicate whether the tape 14 is moving forward or backward and enable the sprocket signals to drive a bi-directional counter such as illustrated in FIGS. 4 and 5.

Referring to FIG. 5, NOR gates 66 and 68 are cross-connected to form the C flip-flop while NOR gates 70, 72, 74, and 76 implement the off and on conditons indicated for the C flip-flop in the logic equations of FIG. 4. NOR gates 78 and 80 are cross-connected to form the D flip-flop while NOR gates 82, 84, 86, and 88 implement the off and on condition indicated for the D flip-flop in the logic equations of FIG. 4, Inverting amplifiers 90 and 92 provide the $\bar{A}$ and $\bar{B}$ signals for gates 70–76 and 82–88.

The C and D output signals of the first counter stage shown in FIG. 5 are applied as the input to an identical second stage (FIG. 6) whose outputs E and F are applied as the input to an identical third stage, and so on to the end of the counter capacity. In this example an eight stage counter is used for addressing an eight bit address buffer memory. One output signal from each counter stage serves as the output of the counter and also constitutes the address input number for buffer memory 52.

The same counter circuit can be used for output pointer counter 60 if desired.

It should be noted that the output number of the counter will decrement if the tape travels in the reverse direction which gives the counter and the tape reader a reverse scan capability. If it is desired to re-read a character or block of characers, tape 14 can be run in reverse back to the character or characters in question, which can then be re-read without upsetting the order of data in buffer memory 52. Also, if tape 14 should bounce back on stopping, sprocket counter 54 will bounce back with it and this prevent errors due to bounce back. It should be understood, however, that th bi-directional capability can be omitted in applications in which it is not required. In this case, a single sprocket photocell could be employed instead of the dual, quadrature related photo-cells disclosed herein.

Another advantage of this invention is that the reading of the sprocket holes occurs at the same location where the data holes are read. In the prior art devices, the sprocket was spaced by one or more inches from the data reading photocells and this permitted errors to develop which are eliminated when the address of the data is determined by a sprocket signal which is read at the same location as the data signals.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principals of this invention having now been fully explained in connection with the foregoing, I hereby claim as my invention:

1. A digital data reader for reading a digital data storage medium having digital data indicia thereon arranged in discreet characters and having digital reference indicia thereon arranged to identify each character, said digital data reader comprising:
    means for reading said reference indicia and generating reference signals corresponding thereto;
    means for reading said data indicia and generating data signals corresponding thereto;
    a reference counter;
    means for coupling said reference signals to said reference counter to count said reference signals;
    a buffer memory having an address input and an output;
    means for writing said data signals into said buffer memory at the addresses indicated by said reference counter;
    means for reading said data signals out of said buffer memory;
    a second counter;
    means coupling the output of said second counter to the address input of said buffer memory to read said data signals out of said buffer memory;
    a time division multiplexer having two sets of inputs and one set of outputs, said multiplexer being operable to alternately couple said two sets of inputs to said outputs, one set at a time;
    means coupling one of said sets of inputs to the output of said reference counter;
    means coupling the other of said sets of imputs to the output of said second counter; and
    means coupling said set of outputs to the address input of said buffer memory.

2. A digital data reader according to claim 1 and also comprising:

a clock signal input on said time division multiplexer; and means coupling a clock signal to said clock signal input.

3. A digital data reader for reading a punched tape having digital data thereon arranged in discrete characters and having sprocket holes arranged to identify each character, said digital data reader comprising:

means for illuminating said sprocket holes;

two photocells means which are positioned opposite said sprocket holes and are spaced apart along the longitudinal axis of said punched tape, and two photocells being spaced apart by a distance which causes quadrature signal outputs therefrom when said tape is moved past said photocells;

means for reading said data indicia and generating data signals corresponding thereto;

a bidirectional reference counter;

means coupling the output of said photocell means to said reference counter to count said sprocket holes;

a buffer memory having an address input and an output;

means for writing said data signals into said buffer memory at the addresses indicated by said reference counter;

means for reading said data signals out of said buffer memory;

a second counter;

means coupling the output signals of said second counter to the address input of said buffer memory to read said data signals out of said buffer memory; and wherein said reference counter comprises:

a plurality of counter stages connected in cascade and the first stage of said reference counter contains two flip-flops C and D which operate in accordance with the following logical equations:

$C_{on} = A \cdot B \cdot \overline{D} + A \cdot \overline{B} \cdot D$ $C_{off} = A \cdot B \cdot D + A \cdot \overline{B} \cdot \overline{D}$ $D_{on} = \overline{A} \cdot \overline{B} \cdot C + \overline{A} \cdot B \cdot \overline{C}$ $D_{off} = \overline{A} \cdot \overline{B} \cdot \overline{C} + \overline{A} \cdot B \cdot C$ where A is the output of one of said photocells, B is the output of the other of said photocells, C is the output of one flip-flop and D is the output of the other flip-flop.

4. A digital data reader according to claim 3 wherein the other stages of said reference counter are identical in circiut configuration to said first stage.

5. A digital data reader for reading a punched tape used to control a numerically controlled machine tool, said punched tape having data indicia thereon arranged in characters and having sprocket holes therein arranged to identify each character, there being only one sprocket hole for each character, said digital data reader comprising:

means for illuminating said sprocket holes;

two photocell means which are positioned opposite said sprocket holes and are spaced apart along the longitudinal axis of said punched tape;

means for reading said data intricia and generating data signals corresponding thereto;

a reference counter;

means coupling the output of both photocell means to said reference counter to count said sprocket holes;

a buffer memory having an address input and an output;

means for writing said data signals and said buffer memory at the addresses indicated by said reference counter;

means for reading said data signals out of said buffer memory;

a second counter; and means coupling the output signals of said second counter to the address input of said buffer memory to read said data signals out of said buffer memory.

6. The digital data reader according to claim 5 and also comprising:

A time division multiplexer having two sets of inputs and one set of outputs, said multiplexer being operable to alternately couple said two sets of inputs to said outputs, one set at a time;

means coupling one of said sets of inputs to the output of said reference counter;

means coupling the other of said sets of inputs to the output of said second counter; and means coupling said set of outputs to the address input of said buffer memory.

* * * * *